No. 709,115. Patented Sept. 16, 1902.
S. A. ROSENTHAL.
GENERATION OF MOTIVE POWER.
(Application filed Dec. 21, 1901.)
(No Model.)
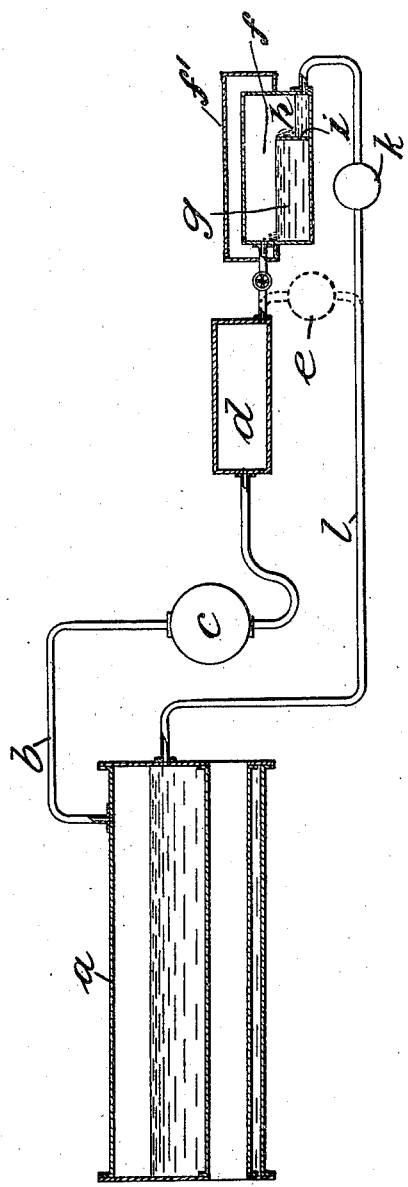
Witnesses.—
Ellis Owen.
John Smith.
INVENTOR.
S. A. Rosenthal
by W. E. Evans
Attorney.

UNITED STATES PATENT OFFICE.

SIGMUND ADOLF ROSENTHAL, OF LONDON, ENGLAND.

GENERATION OF MOTIVE POWER.

SPECIFICATION forming part of Letters Patent No. 709,115, dated September 16, 1902.

Application filed December 21, 1901. Serial No. 86,844. (No model.)

*To all whom it may concern:*

Be it known that I, SIGMUND ADOLF ROSENTHAL, a subject of the King of Great Britain, residing at 37 Walbrook, in the city of London, England, have invented certain new and useful Improvements Relating to the Generation of Motive Power, (for which I have applied for patent in Great Britain, No. 9,372, bearing date May 6, 1901,) of which the following is a specification.

This invention relates to a process for the generation of steam which has for its object to economize fuel.

The invention relates to a process in which a volatile liquid having a low boiling-point, high vapor tension, and low latent heat of vaporization is added to the water in the generator. Such liquids as acetone, petroleum ether, or methyl alcohol may be used for the purpose, and when added to the water in the generator in the proportions hereinafter stated its tension is increased and steam is generated with a less expenditure of fuel than would ordinarily be required.

The accompanying drawing illustrates diagrammatically the apparatus employed to carry out the invention where a volatile liquid is employed immiscible with water. Where immiscible volatile liquid is employed, the tank $f$ (shown in the drawing) is not used.

In carrying the invention into effect a quantity of the liquid or liquids is introduced into the boiler to produce enough vapor at the boiling-point of the liquid or liquids—that is to say, in the proportion of from .1 to .2 per cent. used to fill the space of the boiler above the water-level. A boiler containing about two hundred and twenty gallons of water with an air-space above the water-line of about fifteen cubic feet would require, for example, about two pounds of acetone, while the hot-well in connection with such boiler containing, for example, about forty gallons of water would require about seven pounds of acetone. It will be understood that after the acetone, petroleum ether, methyl alcohol, or other such like liquid or liquids are introduced into the boiler $a$ they are converted into vapor with the water and pass through the steam-pipe $b$ to the engine $c$, where the expansion is utilized, the exhaust passing to a surface condenser $d$, where the vapor is condensed with the steam. The combined liquids are then extracted from the condenser by means of a pump $e$ (indicated in dotted lines in the figure) and returned to the boiler $a$ through the pipe $l$, the tank $f$ not being employed.

When the volatile liquid employed is immiscible with water, the water and volatile liquid are passed into a tank $f$. This tank may have a water-jacket $f'$ around its upper part for the condensation of any vapor that may arise and is divided into two compartments $g\ h$ by means of a partition $i$, the one compartment $h$ being smaller than the other $g$. The liquids enter the larger compartment $g$ and overflow into the smaller compartment $h$, from which they are supplied to the boiler $a$ by a feed-pump $k$, so that thereby the volatile liquid or liquids is or are continuously used. By such an arrangement of the tank into compartments the volatile liquids which are immiscible with water will be passed through to the boiler instead of remaining above the water in the tank. At the commencement of operation a quantity of volatile liquid or liquids used is introduced into the hot-well or condenser $d$, so that there may always be sufficient volatile liquid or liquids within the generator for the purpose to be accomplished.

What I claim as new, and desire to secure by Letters Patent, is—

1. A compound liquid for use in steam generation, consisting in combination, of water together with from .1 to .2 per cent. of a liquid of low boiling-point, high vapor tension, and low latent heat of vaporization, substantially as described.

2. A compound liquid for use in steam generation, consisting in combination, of water together with from .1 to .2 per cent. of acetone, substantially as described.

In testimony whereof I have signed my name to this specification in the presence of two subscribing witnesses.

SIGMUND ADOLF ROSENTHAL.

Witnesses:
    FRIDOLM FREI,
    G. F. WARREN.